UNITED STATES PATENT OFFICE.

JOSEPH MISKO, OF BUFFALO, NEW YORK, ASSIGNOR OF ONE-HALF TO E. N. DICKERSON, OF STOVALL, NORTH CAROLINA.

PROCESS OF PURIFYING IRON.

No. 868,610.  Specification of Letters Patent.  Patented Oct. 15, 1907.

Application filed January 5, 1907. Serial No. 350,941.

*To all whom it may concern:*

Be it known that I, JOSEPH MISKO, of Buffalo, county of Erie, State of New York, have invented a new and useful Process of Purifying Iron.

The object of my invention is ultimately to purify molten iron or steel, especially by eliminating the gases contained therein and to get rid of further impurities, thereby rendering the product stronger and more homogeneous.

It is well known that molten iron and especially steel contain a great many mechanically occluded or inter-molecular dissolved and reactionary gases, such as oxygen, nitrogen, hydrogen, carbonic oxid, carbon dioxid, and other gases. These gases mean discontinuity of mass and lack of strength. To eliminate these impurities, I make use of the metal calcium. Since the metal calcium is very expensive, I make use of it in a compound form. The compound of course has to be of a character that will melt easily and decompose in molten iron or steel to liberate the metallic calcium for action. Calcium carbid is the best compound that will serve the purpose, but the melting point of this carbid is so very high that it has to be first lowered. I have found that calcium carbid will alloy with iron readily, and form what may be termed ferro-calcium-carbid, the melting point of which is very much lower, according to the amount of iron contained therein. It furthermore remains liquid for a much longer time, a very essential feature in the process.

To purify iron or steel, I first melt it and add to it molten ferro-calcium-carbid containing about 90% of iron, about 6% of calcium and about 4% of carbon. The reaction is almost instantaneous. The metallic calcium has a much greater affinity for the impurities and gases contained in the iron than it has for either the carbon in the carbid or the iron with which it is alloyed. And therefore the carbid decomposes instantly and the nascent atoms of the metallic calcium combine with the sulfur and burn into calcium sulfid; with the phosphorous into calcium phosphide, with the gases into oxids, nitrids, fluorids and other combinations. Carbonic oxid and carbon dioxid is decomposed by it, as well as the slag contained in the metal, and the oxygen in each case combines with the calcium to form salts of various character. All of these salts come to the surface in the form of slag and are easily eliminated and thereby the purification desired is effected. It is not necessary in all cases to melt the ferro-calcium-carbid as it can be readily thrown into an open hearth furnace containing molten steel, or into a Bessemer converter, and also into a cupola furnace where cast iron is being melted.

In making ferro-calcium-carbid, the iron may either be added in the proportion desired at the time of adding the charge for making calcium carbid to the electric furnace or after the calcium carbid is formed in the furnace, the iron may be added. Of course pure materials should be used in forming ferro-calcium-carbid.

In regard to the proportion of iron which is to be added to the carbon and lime, this is not material provided enough iron is added to reduce the melting point of the ferro-calcium-carbid to a point at which it will melt in connection with the iron which is to be purified. The iron should, however, in any event, be in excess of 10% and I have found 80 or 90% of iron to be advantageous. I also propose to add to the purified iron charge other alloying compounds such as ferro-titanium, ferro-chromium, ferro-manganese, ferro-vanadium, nickel or molybdenum etc. These are preferably to be added in the desired proportions after the purification by ferro-calcium-carbid, but in some cases they may be alloyed or compounded with ferro-calcium-carbid and simultaneously added. It will be found that the proportionate amount of these rarer metals to be added will be less after the primary purification by ferro-calcium-carbid than though the iron had not been originally so purified. Of these rarer metals I prefer titanium and for some purposes cobalt may be used but in all cases according to my invention ferro-calcium-carbid must be used for the purification of the iron so as to obtain the most beneficial results from the addition of the rarer metals.

What I claim as my invention and desire to secure Letters Patent is:—

The process of purifying iron, which consists in adding thereto ferro-calcium-carbid and fusing the same therein, substantially as described.

In testimony whereof I have signed this specification in the presence of two subscribing witnesses.

JOSEPH MISKO.

Witnesses:
CHAS. E. REED,
Mrs. C. E. REED.